Patented Feb. 20, 1951

2,542,849

UNITED STATES PATENT OFFICE 2,542,849

DIAZOTYPES CONTAINING PYRONONES

William H. von Glahn, Loudonville, and Lester N. Stanley, Delmar, N. Y., assignors to General Aniline & Film Corporation, New York, N. Y., a corporation of Delaware No Drawing. Application October 22, 1948, Serial No. 56,046

7 Claims. (Cl. 95—6)

This invention relates to diazotype photo-reproduction media, to the light sensitive materials utilized in the production thereof, and more particularly to the azo or coupling components of that class which are capable of yielding prints of a dark shade.

It is known that the diazotype process involves treating a base such as paper with a sensitizing composition containing a light sensitive diazo compound, exposing the treated base through a pattern or transparency containing the design to be copied and subjecting the exposed material to development by means of an alkali in the presence of a coupling component capable of reacting with the undecomposed diazo compound to yield an azo dyestuff image. Although many sources of actinic light are employed for the purpose of exposing the sensitized material and decomposing the diazo compound in the exposed area to a form which will not couple with a coupling component, those sources of actinic light are preferred which are rich in the ultraviolet band of from 3600 Å. to 4200 Å. This is a positive reproduction process since the dye components in the exposed area are rendered incapable of forming a color after exposure, and the parts which are reproduced are those which have been protected from exposure to the actinic light by the lines or other opaque areas of the original. In one modification of the process the sensitizing composition for the base contains only the diazo compound, the azo coupling component being applied separately at the time of development. In another and more generally used modification the sensitizing composition for the base contains both the diazo compound and the azo coupling component, azo dye formation taking place after exposure by subjecting the exposed sensitized material to the action of a volatile alkaline agent, preferably ammonia vapors.

The exacting requirements of the diazotype art set rather rigid standards for the selection of the dye components to be used in the sensitizing composition for production of a diazotype photo-reproduction material. The dye components must be capable of producing dyes which have good permanency and substantivity for the base material. The dyes must have good wash-fastness properties so that the image will not be blurred by bleeding of the dye into the background. They must also be fast to light and to offset, that is, rubbing off of the dye by abrasive means with which the print may be contacted. This last property is particularly important where the diazotype prints are intended for use as transition originals in the reproduction of further copies. In the two-component process the sensitizing materials must be stable to precoupling or spontaneous coupling prior to use, and against oxidation. Lack of stability to precoupling and oxidation results in an over-all production of discoloration in the background of the ultimate prints and consequent loss of contrast between the image and the background.

In all positive photoprinting processes, particularly where final copies are being made, it is highly desirable to produce a copy which will have a distinctive color, preferably a dark shade on a clear background. The sensitivity of the diazo compound to actinic light, and in the case of two-component diazotypes the stability of both the diazo compound and the azo component against precoupling are the principal contributing factors to the provision of a clear background. Oxidation of the coupling component either before or after exposure and development and oxidation of the photolysis products of the diazo compound also contribute to the formation of discoloration in the background.

It has been found in practice that there are but few coupling components which meet the exacting requirements of the diazotype art. Generally, the art has resorted to the utilization as coupling components of aromatic polyhydroxy compounds, particularly resorcinol and resorcinol derivatives, for the production of colors in the yellow and brown range, and phloroglucinol or naphthols such as 2,3-dihydroxy nahpthalene for the production of colors in the blue range. While these couplers meet many of the requirements and are generally satisfactory, they suffer from the disadvantage that they have a marked tendency to precouple on storage. There has been some suggestion to use pyrazolones, but this has not been widely adopted. Hydroxy pyridones have been suggested in Patent No. 2,431,190, but have not been used to any extent. Other than these suggestions, it is rare to find any suggestion that heterocyclic type couplers be utilized for the production of diazotype prints.

We have now found a new class of couplers, heterocyclic in nature, which are known as the pyronones which have all of the necessary properties for two-component as well as one-component diazotypes and will produce images of a dark shade when reacted with a diazo compound of the class generally used as the light sensitive element in diazotypes. The colors which are produced by this class of coupling components when reacted with such diazo compounds as the monodiazo derivatives of p-phenylene diamines range in color from bright red to dark blue. The colors are particularly fast to light, washing and offset. The light sensitive coating prior to use is very stable against precoupling when used in a two-component system, and the pyronone coupling components do not easily oxidize to off-color products.

The pyronones which are utilized as coupling components according to the present invention are represented by the following formulae:

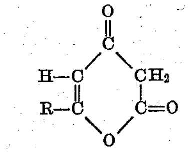

and

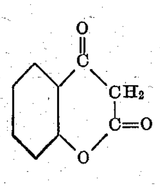

wherein R represents an alkyl radical, such as methyl, ethyl, propyl, butyl, isobutyl and the like, or an aryl radical, such as phenyl, tolyl, anisidyl and naphthyl. These pyronone derivatives may be obtained by the process used by Colie, Journal of American Chemical Society, vol. 59, page 607 (1891), in his discovery of 6-methyl pyronone by making the proper substitution to effect the particular alkyl or aryl derivative desired. In the preparation of 6-ethyl pyronone, for instance, dehydrapropionyl acetic acid is dissolved in three times its weight of 90% sulfuric acid. It is heated rapidly to a temperature of 130° and kept at this temperature until no starting material remains. After about five minutes the reaction is complete and the solution is cooled to about 30° C. and chilled by pouring it on ice. The 6-ethyl pyronone which precipitates is filtered and washed with water. It is obtained in a yield of about 70%. The 6-propyl, -butyl or -isobutyl pyronones are prepared in the same manner by using glutaric anhydride, valeryl chloride or isovaleryl chloride, respectively, in lieu of the propionic anhydride used in obtaining the 6-ethyl pyronone. The 6-methyl and 6-phenyl pyronones may be prepared in a one-step process because of the availability of dehydracetic acid and dehydrobenzoyl acetic acid, respectively. The 5,6-benzo pyronone may be prepared by an intramolecular Claisen type condensation using the method of Pauly and Lockemann (Ber. 48, 31, 1915) which schematically is as follows:

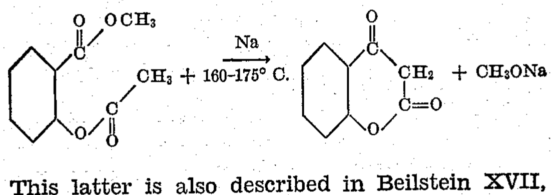

This latter is also described in Beilstein XVII, page 488, under the names 2,4-dioxochromane, 4-oxycoumarin and benzotetronic acid.

The dehydropropionyl acetic acid used as the parent material in the process for producing the 6-ethyl pyronone has the following formula:

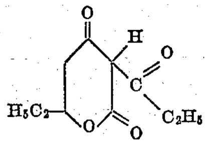

It is prepared from dehydropropionyl acetocarboxylic acid of the formula:

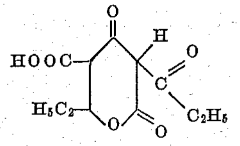

by heating a potassium hydroxide solution of said acetocarboxylic acid having a pH of between 6 and 8 to a temperature of 90° C. for a few hours. The dehydropropionyl acetic acid thus formed is precipitated by addition of acetic acid, filtered and washed with water.

The dehydropropionyl acetocarboxylic acid in turn is obtained by reacting propionic anhydride in excess of theory with acetone dicarboxylic acid while maintaining a temperature of from about 0 to 10° C. The resulting solution is then vacuum distilled to eliminate propionic acid. The residue in the still is cooled, then chilled with ice, whereupon an immediate separation of solid takes place. The solid dehydropropionyl acetocarboxylic acid is then filtered and washed with water.

The diazo component which is utilized with the pyronone coupling components may be any of those generally employed in the diazotype art, such as diazos derived by diazotization of amino-naphthol sulfonic acids or preferably those derived by diazotization of a p-phenylene diamine. As a practical matter mono diazo compounds of this preferred class are substituted at least once on the amino group in para-position to the diazo group by such groups as alkyl, alkoxyalkyl, aryl, aralkyl, alkylol, cycloaliphatic and heterocyclic radicals but the unsubstituted compounds are included. These diazo compounds may be utilized as such or in the form of their stabilized double salts, such as the double salt of the diazonium chloride with zinc chloride, cadmium chloride, tin chloride or the like, the double salt of the diazonium chloride with fluoroborates or the complex of the diazo with alkyl or aryl sulfonates, such as the methyl, ethyl, propyl and phenyl sulfonates or the acid sulfates of the diazo. The following table comprises a list of amines from which suitable diazo compounds may be obtained by diazotization and combination with such stabilizing complex salt-forming compounds as may be desired.

*Table of amines*

2,5-diethoxy-4-(4′-ethoxyphenyl) aniline
p-(N-hydroxyethyl-N-methylamino) aniline
p-(N-hydroxyethyl-N-ethylamino) aniline
p-Aminodiphenylamine
p-Ethylamino-m-toluidine
p-Dimethylamino-o-toluidine
p-Diethylamino-o-phenetidine
4-benzoylamino-2,5-diethoxyaniline
2-amino-5-dimethylaminobenzoic acid
p-Dimethylaminoaniline
p-Diethylaminoaniline
p-(N-benzyl-N-ethylamino) aniline
p-Dihydroxyethylaminoaniline
p-(N-ethyl-N-hydroxyethylamino)-o-toluidine
p-Dihydroxyethylamino-o-chloroaniline
p-Ethylaminoaniline
p-phenylenediamine The sensitizing compositions may contain in addition to the diazo compound and the azo coupling component the usual adjuncts such as metal salts for intensification of the dye image, as for example, aluminum sulfate, titanium ammonium fluoride, nickel sulfate and zinc chloride; stabilizing agents such as thiourea, naphthalene trisulfonic acid and the like; stabilizing acids for retarding precoupling such as citric acid, boric acid and tartaric acid; hygroscopic agents such as ethylene glycol, glycerin and dextrin; solvents such as isopropyl alcohol and wetting agents such as saponin. The base material upon which the light sensitive layer is coated may be a sheet film or web-forming material such as cotton, linen, rayon or the like, paper, film of cellulosic derivatives and other materials such as polyvinyl derivatives and superpolyamides.

While it is preferred to that the pyronone couplers be incorporated in the sensitizing compositions in accordance with the two-component diazotype method, nevertheless the invention may be also applied according to the one-component method, wherein the sensitized layer contains the diazo compound and the azo component is applied subsequently in a developing solution to effect the development of the exposed image.

The invention is further illustrated by the following examples, but it is understood that the invention is not restricted thereto, as the examples are for the purpose of illustration and are not intended to be limitative.

*Example 1*

Diazotype paper stock made of 100% rag paper is coated with an aqueous solution containing the following ingredients per 100 cc. of solution:

0.9 gram 6-ethyl pyronone
2.4 grams N-ethyl-N-hydroxyethyl-meta-toluidine-p-diazo $ZnCl_2$ double salt
8.0 grams citric acid
4.0 grams thiourea
5.0 grams $ZnCl_2$ The resulting sensitized paper after exposure under a patternand development in the usual developing machines with gaseous ammonia yields prints of an attractive bright blue hue, having well defined lines against a pure white background. Prior to exposure and development the sensitized paper has excellent stability to precoupling in storage, even under extreme conditions of an accelerated aging test. After being subjected to the severe temperature and humidity conditions of the accelerated aging test, the prints obtained upon subsequent exposure and development show only very slight residual color in the background. Under this same test most of the couplers heretofore employed for the production of dark shades in diazotypes quickly develop substantial background color.

*Example 2*

Diazotype paper stock is coated in the same manner as in Example 1, substituting 2.2 grams diethyl aniline-p-diazo $ZnCl_2$ double salt for the diazo compound of that example. In this case, a lavender blueprint is obtained on a white background. This print and the light sensitive coating, prior to exposure and development, have the same properties as the product of Example 1.

*Example 3*

A diazotype paper stock is coated with an aqueous solution containing the following ingredients per 100 cc. of solution:

0.8 gram 6-methyl pyronone
2.0 grams N-ethylaniline-p-diazo-$CdCl_2$ double salt
8.0 grams citric acid
4.0 grams thiourea
5.0 grams $ZnCl_2$ The precedure for processing the sensitized paper of this example is the same as in Example 1. Its stability properties against precoupling are of the same degree as the diazotype material of Example 1. The prints are obtained in a violet shade on a white background.

*Example 4*

Diazotype paper stock is coated with an aqueous solution containing the following ingredients per 100 cc. of solution:

3.2 grams 2,5,4'-triethoxy diphenyl 4-diazonium acid sulfate
4.0 grams thiourea
2.0 grams citric acid
5.0 grams $ZnCl_2$ The sensitized paper after drying is exposed under a pattern and developed with a mildly alkaline solution of 6-methylpyronone. Prints are obtained in a bright maroon shade on a white background which have good properties of light fastness, fastness to washing and fastness to offset.

*Example 5*

Diazotype paper stock is coated with a sensitizing solution similar to that of Example 4, except that 3.5 grams of 4-benzoyl-amino-2,5-diethoxy benzene diazo $ZnCl_2$ double salt are used as the diazo compound in place of the diazo of that example. The sensitized paper of this example is then exposed under a pattern and developed with a mildly alkaline solution of 6-ethyl pyronone. Prints are obtained in a bright red shade on a clear white background, having properties similar to the product of Example 4.

*Example 6*

Diazotype paper stock is coated with an aqueous solution containing the following ingredients per 100 cc. of solution:

1.0 grams 6-propyl pyronone
2.3 grams N-hydroxy-ethyl-N-methylaniline-p-diazo $ZnCl_2$ double salt
8.0 grams citric acid
4.0 grams thiourea
5.0 grams $ZnCl_2$ The sensitized paper obtained from the coating solution of this example has the same properties as that obtained in accordance with Example 1 and prints are obtained therefrom in bright blue shades on a clear white background, which prints have good properties of fastness to washing, light and offset.

*Example 7*

Diazotype paper stock is coated with an aqueous solution containing the following ingredients per 100 cc. of solution:

1.2 grams 6-phenyl pyronone
2.4 grams N-ethyl-N-hydroxyethylaniline p-diazo $ZnCl_2$ double salt
8.0 grams citric acid
4.0 grams thiourea
5.0 grams $ZnCl_2$ The sensitized paper obtained from the coating solution of this example has the same properties as that obtained in accordance with Example 1 and prints are obtained therefrom in blue shades on a clear white background, which prints have good properties of fastness to washing, light and offset.

*Example 8*

Diazotype paper stock is coated with an aqueous solution containing the following ingredients per 100 cc. of solution:

1.2 grams benzopyronone
2.6 grams N-ethyl-N-hydroxy-ethylaniline p-diazo $ZnCl_2$ double salt
8.0 grams citric acid
4.0 grams thiourea
5.0 grams $ZnCl_2$ The sensitized paper obtained from the coating solution of this example has the same properties as that obtained in accordance with Example 1 and prints are obtained therefrom in blue shades on a clear white background, which prints have good properties of fastness to washing, light and offset.

In the accelerated aging tests used to determine the stability of the diazotype coatings of these examples against precoupling and decomposition of the dye components, the sensitized carrier, after the usual drying process, is subjected to a temperature of 120° F. for 48 hours at a relative humidity of 50%.

We claim:

1. Light sensitive diazotype material comprising a suitable base material carrying a light sensitive diazo compound and a coupling component selected from the class consisting of those having the formulae:

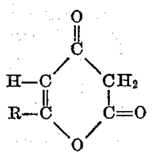

and

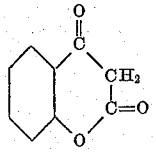

wherein R is a member of the group consisting of alkyl and aryl radicals.

2. Light sensitive diazotype material comprising a suitable base material carrying a light sensitive mono-diazo compound of a p-phenylene diamine and a coupling component selected from the class consisting of those having the formulae:

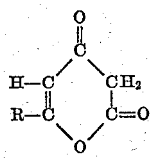

and

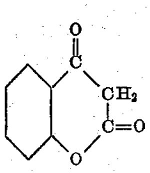

wherein R is a member of the group consisting of alkyl and aryl radicals.

3. Light sensitive diazotype material comprising a suitable base material carrying a light sensitive diazo compound and 6-ethyl pyronone.

4. Light sensitive diazotype material comprising a suitable base material carrying a light sensitive diazo compound and 6-methyl pyronone.

5. Light sensitive diazotype material comprising a suitable base material carrying a light sensitive diazo compound and 6-phenyl pyronone.

6. The light sensitive diazotype material of claim 3, wherein the diazo compound is an N-ethyl-N-hydroxyethyl-meta-toluidine-p-diazo.

7. The light sensitive diazotype material of claim 4, wherein the diazo compound is an N-ethylaniline-p-diazo.

WILLIAM H. von GLAHN.
LESTER N. STANLEY.

REFERENCES CITED

The following references are of record in the file of this patent:

UNITED STATES PATENTS

| Number | Name | Date |
|---|---|---|
| 2,034,303 | Krzikalla et al. | Mar. 17, 1936 |
| 2,034,304 | Krzikalla et al. | Mar. 17, 1936 |
| 2,378,583 | Schmidt et al. | June 19, 1945 |

OTHER REFERENCES

Spencer: "Photographic Applications of Diazo Compounds," The Photographic Journal, Dec. 1928, pp. 490 to 496, pp. 490 and 491 cited.